3,110,600
METHOD OF DRYING A LACTULOSE-CONTAINING AQUEOUS LIQUID
Antonie Bok, Weesp, Netherlands, assignor to N. V. Tervalon (Maatschappij voor voedingsmiddelen op wetenschappelijke basis), Amsterdam, Netherlands
No Drawing. Filed Apr. 20, 1961, Ser. No. 104,261
Claims priority, application Netherlands Apr. 22, 1960
13 Claims. (Cl. 99—203)

This invention relates to a method of producing a lactulose containing powder.

It is known, that with infants' food which contains a sufficient content of lactulose, a so-called pure bifidus flora can be produced in infants. In general, the occurrence of a pure bifidus flora in babies is judged to be favourable since it is an indication of a good state of health of the young child. For this reason, lactulose-containing infants' food has found ready acceptance in pediatrics.

For the preparation of lactulose, various methods are available. In general, epimerised in an aqueous medium at a pH above 5. Subsequently, non-converted lactose is separated, the residue oxidized with bromine, the acids formed removed and the acid free lactulose product is then crystallised.

However, in practice the obtaining of a crystalline lactulose product is a very difficult task which is not easy to solve and has so far not yet resulted in a commercial usable method. Another method wherein octaesters of lactulose are used is too cumbersome for commercial practice.

In view of the difficulties of producing in a commercial operation crystalline lactulose it was decided to prepare a dry lactulose production by the drying of lactulose-containing aqueous liquid, followed by pulverization, if desired. It has appeared, however, that a number of drying methods did not give satisfactory results. For example when drying an aqueous lactulose-containing liquid on a heated roller, a product was obtained which hardly could be made suitable for commercial purposes.

Difficulties were encountered also in the spray drying of a lactulose-containing aqueous liquid in a hot gas, for example air of ±140–170° C. The resulting product was only partially powdered and consisted for a large part of a sticky mass which adhered to the surfaces of the spraying apparatus and could only be removed from the spraying apparatus with difficulty.

It is therefore a principal object of this invention to provide a lactulose-containing composition that can be economically dried in commercial production.

This and other objects of the invention will be apparent from the description that follows:

According to my invention a dry lactulose-containing product may be economically produced in commercial production by spray drying in a hot gas, at a temperature between about 135° C. and 170° C. a lactulose-containing aqueous liquid containing solids in a maximum amount of 45–50% by weight, said solids containing up to 50% by weight of lactulose and part at least of the remainder lactose.

The upper limit of lactulose has been set at 50% because percentages in excess thereof have been found to produce a sticky product.

The lower limit of the lactulose content is determined only by economic consideration. It has been found in practice that 20% is a satisfactory lower limit.

Lactose must be present in the aqueous liquid otherwise a dried product cannot be formed. However, part of the lactose may be substituted for by other non-hygroscopic carbohydrates. Galactose in an amount of 2–5% by weight of the solids content was particularly found to be acceptable for this purpose.

When drying aqueous liquids containing lactulose in an amount not in excess of 30% of the solids contents satisfactory results have been obtained when the remainder of the solids consisted of lactose or a mixture of lactose and galactose in the amount indicated. In such cases particularly good results were obtained when the lactulose content was 26–29%, preferably 27%, of the dry contents of the liquid.

When drying liquids in which the lactulose content is in excess of 30% it has been found that the addition of a gelatinized water soluble flour in an amount up to 8% but preferably in an amount of 2–5% by weight based on the solids content is of great advantage. A suitable example of such a flour is pre-cooked rice flour although other pre-cooked flours such as pre-cooked oatmeal or barley may likewise be employed. By the addition of 2–5% of pre-cooked rice flour it is possible to produce a dry powdered composition from a syrup containing 40% by weight of lactulose based on the solids content.

It is of importance that the content of dry substance of the syrup to be sprayed is not too large. An upper limit lies at about 35%. If, however, 2–8% based on the solids contents of gelatinised flour, preferably rice flour, is added, the maximum content of dry substance of the syrup to be sprayed can be increased to 50%. The lower limit is determined by practical considerations. These considerations are the heat-economy of the method and in addition the fact that the weight of the sprayed and dried drops will become very low in the case of too low a concentration of the solid constituents, as a result of which the drops are easily conducted away by the drying air from the spray tower.

For this reason it is recommended that the lower limit of the content of dry substances in the aqueous liquid to be sprayed not be below 25–30% by weight.

The normal drying towers may be employed for drying the aqueous liquid. No special attention need be paid to the spraying apparatus. When effecting the invention, excellent results were obtained with spray apparatus of the Krauser type and of the Lurgi type. Naturally, it should be taken into account that the temperature of the air blown into the drying tower is not too high since otherwise burning of the lactulose and lactose may occur which would result in colouring the product brown. The inlet temperature of the drying air for example, should not exceed approximately 170° C. Excellent results can be obtained when the inlet temperature of the drying air lies between 145° C. and 165° C. The lowest permissible temperature of the air in the drying tower also is of importance to prevent insufficient drying. This minimum temperature has been found to be 135° C.

At temperatures between 90° C. and 130° C., important physical changes in lactulose and lactose occur. To prevent these changes the temperature of the dried powder in the tower should not exceed 80° C.–90° C. By keeping the temperature of the dried powder below these values, melting of the lactulose or even of conversion from $\beta$- into $\alpha$-lactose is prevented. The temperature of the powder in the drying tower is obtained by measuring the temperature of the air leaving the drying tower. This temperature under good conditions should be between 80° C. and approximately 95° C.

In the normal performance of the method according to the invention a product is obtained which may contain approximately 2% of moisture. A lower percentage is also possible, but this will as a rule not be lower than 0.5%. The desired moisture content of the powder may inter alia be controlled by choosing an exact ratio of the quantity of drying air with respect to the quantity of water to be evaporated from the syrup. All this depends on the quality of the tower and on the efficiency of the heat transfer which takes place in it, but as a rule satisfactory results will be obtained when 1 kg. of syrup is heated with 30 to 70 kg. of air at the above-mentioned temperature. It should be ensured that the product contains not more than 4% of water, since otherwise the product starts forming a cake. For this reason it is recommended that the dried product not be stored under moist conditions. However, the product may be stored without objections in air of room temperature of a relative humidity of approximately 25–30%.

The particles of a product obtained according to the method of the invention are porous spheres. These spheres are very small and have a size of from 2–50μ. The product is free flowing at a moisture content lower than 4%. The rate of dissolving in water is very large. For example in a ten-fold quantity of water, the product entirely dissolves in less than 2 minutes. In comparison, a lactulose-lactose-containing syrup containing microcrystalline lactose, dissolves far less rapidly in water.

The product obtained according to the invention has not been described in the literature before and said dry substances may be described as follows:

A dry, free-flowing mixture consisting of 20–45% of lactulose, 70–45% of lactose, up to 5% of a sugar other than lactose or lactulose, up to 5% of a gelatinised flour and 0.5–4% of water, of which the separate particles are porous spheres and have a size of from 2–50μ. This product preferably contains from 30–45% of lactulose, 2–5% of precooked rice-meal, 2–5% of galactose, 60–55% of lactose and 0.5–3% of water.

The invention will now be described in greater detail with reference to the following examples.

*Example 1*

An aqueous liquid, having a content of dry substances of 55% and consisting of 27% of lactulose, 68% of lactose, and 5% of galactose was heated to 90° C. and, at this temperature, sprayed in a drying tower by means of a Lurgi disc sprayer which has a normal evaporation of water of 140 l. per hour. The warm air passing into the spraying apparatus had a temperature of 155° C. The temperature of the air conducted away was 85° C. 3 kg. of the above described syrup were sprayed per minute, the disc speed of the evaporator amounting to 7600 r.p.m.

In this experiment no favourable results were obtained. The powder has a somewhat sticky character and strongly adhered to the wall of the drying tower. Then the experiment was interrupted and after cleaning the tower, spraying was continued with a similar syrup which, however, had been diluted with water to a dry substance content of 35%. Also the spraying speed was reduced to 1½ kg. of syrup per minute. The other conditions were the same. A dry, powdered lactulose-lactose preparation was obtained having a moisture content of approximately 2.5%.

*Example 2*

250 kg. of lactulose syrup, containing 100 kg. of lactulose, 100 kg. of lactose, 11.75 kg. of galactose and 38.25 kg. of water, were mixed with 158.5 kg. of lactose and 651.5 kg. of water.

The liquid was sprayed in the above described manner in air of which the inlet temperature was 155° C. and the outlet temperature 86° C. The disc speed of the Lurgi-sprayer was 7500 r.p.m.

On spraying the above solution with a content of dry substance of 35%, good results were obtained. However, when the solution had a content of dry substance of 55% poor results were obtained.

*Example 3*

439.5 kg. of lactulose syrup, containing 179.8 kg. of lactulose, 196 kg. of anhydrous lactose and 20.7 kg. of galactose and 43 kg. of water were mixed with 25 kg. of lactose, 25 kg. of pre-boiled rice-meal and 463 kg. of water. This liquid was heated to 90° C. and transferred to a Lurgi atomisation tower at this temperature. The heating air supplied had a temperature of 155° C., while the outlet temperature of the air was 85° C. The disc speed was 7400 r.p.m. The sprayed product had a moisture content of 2.6%.

While I have described my invention in connection with specific embodiments and applications, other modifications thereof will be readily apparent to those skilled in this art without departing from the spirit and scope of the invention as defined in the appended claims.

What is claimed is:

1. A method of producing a dry lactulose-containing product comprising spraying into a hot gas having a temperature between 135° C. and 170° C. an aqueous liquid having a solid content of 25–45% by weight, of which solids 20–45% by weight is lactulose, up to 5% by weight is galactose, from about 2 to 5% by weight is a gelatinized flour and the remainder is lactose.

2. The method of claim 1, wherein the aqueous liquid contains from 2–5% by weight of galactose, calculated on the solids content in addition to lactulose and lactose.

3. The method of claim 1 wherein the aqueous liquid has a lactulose content of 26–29% by weight based on the solids content.

4. The method of claim 1 wherein the aqueous liquid contains 2–5% by weight of a gelatinised starch based on the solids content.

5. The method of claim 4 wherein the gelatinised flour is pre-cooked rice-meal.

6. The method of claim 4 wherein the aqueous liquid contains 30–45% of lactulose by weight calculated on the content of dry substances.

7. The method of claim 1, wherein the aqueous liquid is sprayed into heated air.

8. The method of claim 7, wherein the highest temperature of the air lies between 145° C. and 165° C.

9. The method of claim 8 wherein the temperature of the sprayed product does not exceed 80–95° C.

10. The method of claim 9, wherein 30–70 kg. of heated air are used per kg. of liquid sprayed.

11. A method of producing dry lactulose containing product comprising spraying into a hot gas having a temperature between 135° C. and 170° C. an aqueous liquid having a maximum solids content of 50% by weight, said solids comprising about 20–50% by weight of lactulose, up to 8% by weight and at least 2% by weight of a gelatinized flour, up to 5% by weight of galactose and the remainder lactose.

12. A dry, free-flowing powder composed of 20–45% by weight of lactulose, 70–45% by weight of lactose, up to 5% by weight of galactose and up to 8% by weight of a gelatinised flour and 0.5–4% by weight of water and in which powder the separate particles have a spherical shape, are porous and have a size of 2–50μ.

13. The dry free-flowing powder of claim 12 which contains 30–45% of lactulose, 2–5% of pre-cooked rice-meal, 2–5% of galactose, 60–55% of lactose and 0.5–3% of water all by weight.

References Cited in the file of this patent
UNITED STATES PATENTS

| | | |
|---|---|---|
| 2,174,734 | Chuck | Oct. 3, 1939 |
| 2,835,597 | Barzelay | May 20, 1958 |
| 2,887,390 | Coulter et al. | May 19, 1959 |

OTHER REFERENCES

Chemical Abstracts,* vol. 50, 1956, 13320b.
Chemical Abstracts,* vol. 52, 1958, pp. 550i and 20,721a.
Chemical Abstracts,* vol. 53, 1959, pp. 10,584d and 10,584g.

* Copies in Scientific Library.